(12) United States Patent
Simera

(10) Patent No.: US 7,762,762 B2
(45) Date of Patent: Jul. 27, 2010

(54) ROLLING FLUID MACHINE ESPECIALLY WITH A LIQUID SPRAYING AT THE OUTPUT

(76) Inventor: Miroslav Simera, Hvozdikova 2884/2, 106 00 Prague 10 (CZ)

( * ) Notice: Subject to any disclaimer, the term of this patent is extended or adjusted under 35 U.S.C. 154(b) by 1041 days.

(21) Appl. No.: 10/586,766

(22) PCT Filed: Dec. 23, 2004

(86) PCT No.: PCT/CZ2004/000090
§ 371 (c)(1),
(2), (4) Date: Jul. 20, 2006

(87) PCT Pub. No.: WO2005/071256
PCT Pub. Date: Aug. 4, 2005

(65) Prior Publication Data
US 2009/0116952 A1   May 7, 2009

(30) Foreign Application Priority Data
Jan. 23, 2004   (CZ) .................. PUV 2004-14999

(51) Int. Cl.
*F04D 33/00* (2006.01)
(52) U.S. Cl. .................................. 415/70; 415/90
(58) Field of Classification Search .............. 415/70, 415/80, 90, 904; 173/218
See application file for complete search history.

(56) References Cited

U.S. PATENT DOCUMENTS

| | | | | |
|---|---|---|---|---|
| 5,178,515 A * | 1/1993 | Tsuchiya et al. | ............. | 415/206 |
| 6,139,267 A * | 10/2000 | Sedlacek et al. | ......... | 415/219.1 |
| 6,702,038 B1 * | 3/2004 | Sedlacek et al. | ............. | 173/218 |
| 2003/0138318 A1 * | 7/2003 | Schmertz | ...................... | 415/70 |
| 2003/0147740 A1 * | 8/2003 | Schmertz | ...................... | 415/70 |
| 2005/0198751 A1 * | 9/2005 | Navratil | ....................... | 15/1.7 |

FOREIGN PATENT DOCUMENTS

| | | |
|---|---|---|
| CZ | 13837 U1 * | 11/2003 |
| WO | WO 99/61790 | 12/1999 |
| WO | WO 0144688 A1 * | 6/2001 |
| WO | WO 2004011743 A1 * | 2/2004 |
| WO | WO 2005033504 A1 * | 4/2005 |

* cited by examiner

*Primary Examiner*—Edward Look
*Assistant Examiner*—Aaron R Eastman
(74) *Attorney, Agent, or Firm*—Hovey Williams LLP

(57) ABSTRACT

A rolling fluid machine especially with a liquid spraying at the output, comprising a chamber (1) where at least a part of its inner surface has a rotary shape and the chamber (1) is provided with at least one inlet (2) of fluid and at least one outlet (3) of fluid. In the chamber (1) there is a rolling rotor (4) installed in a manner enabling rolling and swinging. In the chamber (1) the space (5) bellow the rotor (4) and the space (6) above the rotor (4) is interconnected by at least one additional channel (7).

6 Claims, 5 Drawing Sheets

ROLLING FLUID MACHINE ESPECIALLY WITH A LIQUID SPRAYING AT THE OUTPUT

TECHNICAL FIELD

The invention relates to a rolling fluid machine especially with a liquid spraying at the output comprising a chamber where at least a part of its inner surface has a rotary shape and the chamber is provided with at least one inlet of fluid and at least one outlet of fluid, while in the chamber a rolling rotor is installed in a manner enabling rolling and swinging.

BACKGROUND ART

Published international applications WO 98/17910 and WO 99/61790, the disclosure of which is incorporated by reference, describe a rolling fluid machine that may be used, in addition to a number of other applications, as a drive of rotary tools. Such a machine comprises a chamber provided with an inlet of fluid and at least one entrance opening. In front of such an opening, there is a rolling rotor placed on a supporting system. The rotor comprises a rotary-shaped body. A brush may be installed on the outlet shaft.

A published Czech application PV 1999-4624, the disclosure of which is incorporated by reference, describes a room air moisturizer. Its design uses the above described rolling fluid machine. In this embodiment the outlet comprises a channel provided in the upper end of the precession shaft. A part of the liquid leaves the tank through the first outlet opening at the end of the precession shaft and is sprayed by pressure and by the precession movement of the shaft. Another part of the liquid leaves the tank through the second outlet opening to the area between the first friction surface and the second friction surface, thereby improving their mutual movements. The remaining portion of the liquid leaves the tank through the third outlet opening between the first friction surface and the lid of the tank.

A registered Czech utility model CZ 12707, the disclosure of which is incorporated by reference, describes a rolling fluid machine, especially with a liquid spraying at the output, comprising a chamber where at least a part of the inner surface has a rotary shape and the chamber is provided with at least one liquid inlet and at least one liquid outlet while in the chamber a rolling rotor is installed in a manner enabling rolling and swinging. The rotor comprises a hollow shaft and the shaft is provided with at least one additional entrance opening and least one additional exit opening connected to an exchangeable spraying head with spraying openings.

Disadvantage of all known rolling fluid machines is the fact that the liquid flow through the machine is limited by the size of the clearance between the rolling rotor and the inner wall of the machine chamber.

The aim of this invention is to enable to choose which portion of the energy supplied to the rolling fluid machine will be transformed to the mechanical energy (rotor revolutions) and what portion of the supplied energy will be transformed to kinetic energy of the liquid flow at the outlet.

DISCLOSURE OF INVENTION

The above aim will be achieved by a rolling fluid machine especially with a liquid spraying at the output comprising a chamber where at least a part of its inner surface has a rotary shape and the chamber is provided with at least one inlet of fluid and at least one outlet of fluid, while in the chamber a rolling rotor is installed in a manner enabling rolling and swinging, according to the invention the principle of which resides in the fact that in the chamber, the space bellow the rotor and the space above the rotor is interconnected by at least one additional channel.

Use of at least one additional channel between the space below and the space above the rotor, and its sizing, makes it possible for the rolling fluid machine according to the invention to choose what portion of the supplied energy will be converted to mechanical energy (rotor rotations) and what portion of the supplied energy will be converted to kinetic energy of the exiting stream of fluid. Thus, a rolling fluid machine can be designed with a desired ratio of the fluid flow rate at the outlet and rotor rotation, respectively, and the desired torsional moment of the rotor. By increasing the number and/or the cross section of the additional channels, the flow rate of the fluid at the outlet will increase and the rotor revolutions will fall.

Any fluid may serve as the driving medium including gas, liquid, vapour and their mixture. In preferred embodiment liquid, in particular water, is used as the driving medium.

In preferred embodiment the additional channel comprises an opening in the wall of the rotor. The additional channel can also be located outside the interior space of the chamber.

In order to improve the variability of the flow and the resulting torsion moment, a control valve can be installed in the additional channel.

According to another preferred embodiment the additional channel may be connected directly to the hollow shaft of the rotor.

BRIEF DESCRIPTION OF DRAWINGS

The rolling fluid machine according to the invention will be described in details by means of drawings, in which the FIG. 1 shows a cross section of the rolling fluid machine and the first example of the design of additional channels.

MODES FOR CARRYING OUT THE INVENTION

Figure 1:
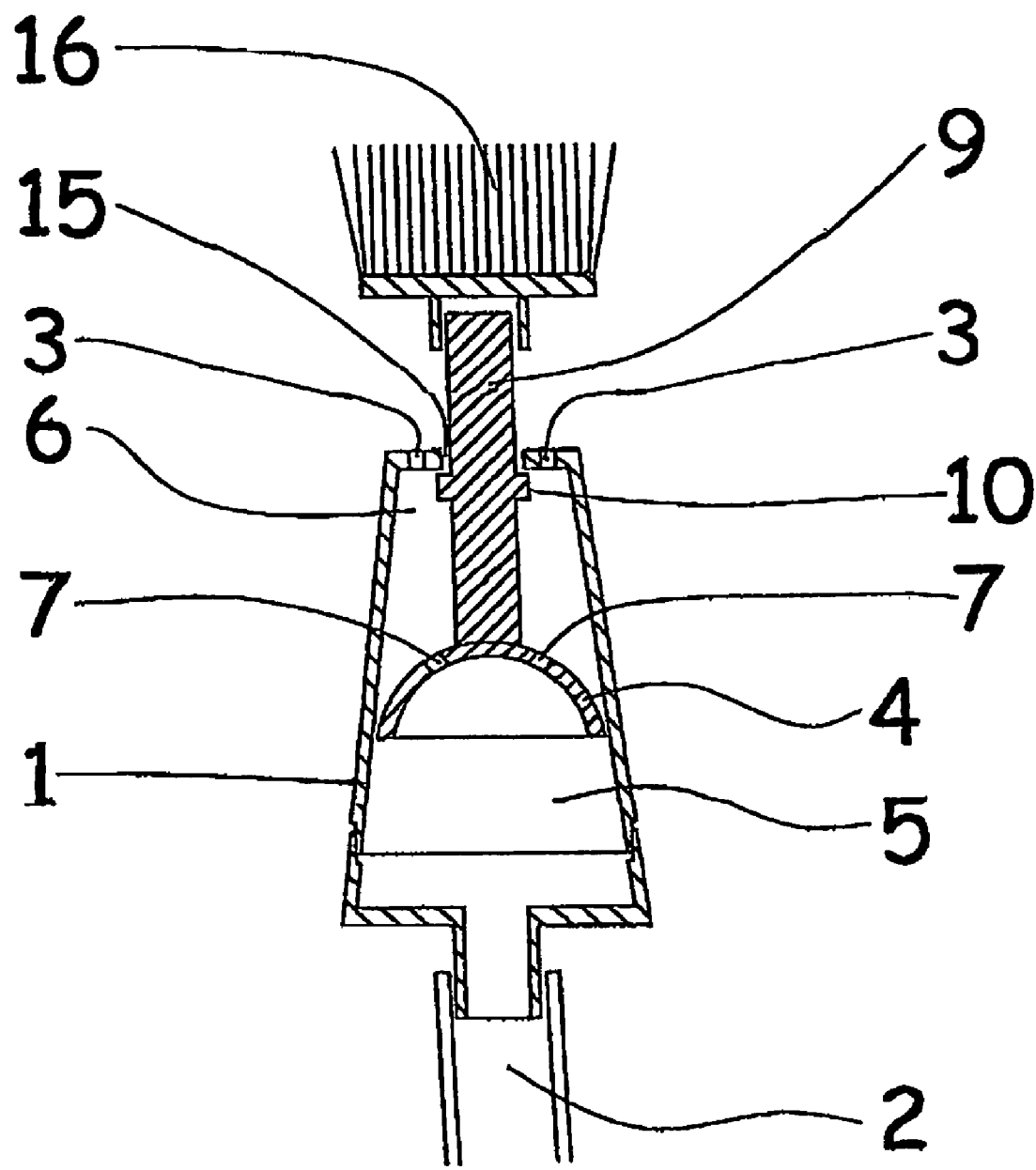

FIG. 1 shows the first example of the rolling fluid machine where the driving medium is liquid. The machine has a liquid spraying system at the output. The liquid driven machine comprises a chamber 1. At one end of the chamber 1, there is the inlet 2 of fluid. On the opposite end of the chamber 1, there are openings configured in a circle used as the outlet 3 of fluid. The inner surface of the chamber 1 has the shape of a truncated cone that narrows in the direction of the flow. In the chamber 1, there is a rolling rotor 4 installed in a manner enabling both rolling and swinging. The rolling rotor 4 is designed as a hollow hemisphere, the open face of which is oriented against the flow of fluid. The rolling rotor 4 can have any rotary shape, for instance a sphere, hemisphere, cone etc. Accommodating the rolling rotor 4 in a manner enabling both rolling and swinging can be achieved through any known design solution. The rotary and swinging accommodation of the rotor 4 shown in FIG. 1 comprises a shaft 9 of the rolling rotor 4 that passes with some clearance through the central opening 15 in the chamber 1. Inside the chamber 1 the shaft 9 has a projection 10 the diameter of which is bigger than the diameter of the central opening 15 in the chamber 1 and, therefore, the projection 10 is pushed by the pressure of the fluid flowing towards the rotor 4 on the inner face of the surface of the chamber 1.

From the point of view of the flow, the total inner space in the chamber 1 may be divided to the space 5 bellow the rotor 4 and the space 6 above the rotor 4. The fluid supplied through the inlet 2 can flow from the space 5 bellow the rotor 4 to the space 6 above the rotor 4 because the maximum external diameter of the rotor 4 is less than the inner diameter of the chamber 1 at the position where the rotor 4 rolls inside of the chamber 1. However, in order to achieve the optimal rolling, the difference between the external diameter of the rotor 4 and the inner diameter of the chamber 1 at the position of rolling cannot be too great and, therefore, the quantity of fluid flowing through the chamber 1 is not sufficient for some applications.

In order to supply more fluid to the outlet 3, the space below the rotor 4 is interconnected with the space 6 above the rotor 4 by the additional channels 7. In this embodiment, the channels consist of two openings in the wall of the rotor 4. The desired flow rate may be easily achieved by choosing the number and/or the cross section of the additional channels 7. By choosing the desired number and/or the cross section of the additional channels the torsional moment on the shaft 9 is also controlled.

In the embodiment as shown in FIG. 1, the fluid is supplied by a hose interconnecting the chamber 1 of the rolling fluid machine with a source of pressurized liquid, for instance a pump, not shown in FIG. 1.

After the start up of the pump, the liquid from a storage tank (not shown in the picture) is pumped to the chamber 1 of the rolling fluid machine. The flowing liquid will not only push the projection 10 of the shaft 9 to the front wall of the chamber 1, but also it will cause the rotor 4 to swing to one side and contact the inner wall of the chamber 1 where it starts to roll in a circular motion along the inner wall of the chamber 1 so that the protruding end of the shaft 9 executes a precession movement showing, however a minimum angle of oscillation. This principle is described in the published international applications WO 98/17910 and WO 99/61790 and, therefore, it will not be discussed in detail. An exchangeable tool, for instance a rotary brush 16 does the same precession movement as the protruding end of the shaft 9. In this embodiment, the brush 16 is kept wet with the liquid flowing from the outlet openings 3. A certain quantity of liquid leaks from the chamber 1 also trough the central opening 15 for the shaft 9 because the central opening 15 in this embodiment does not need to be sealed. Of course, the machine may be designed where the central opening 15 around the shaft 9 may be perfectly sealed by known sealing arrangements.

It is apparent that the tool can be any rotating tool and not only the rotating brush 16. It is also possible to use as a tool jets, spray heads, massage jets, cleaning nozzles etc.

When passing through the chamber 1, the fluid flows from the space 5, located below the rotor 4, to the space 6, located above the rotor 4, through the clearance between the rolling rotor 4 and the wall of the chamber 1 and through the additional channels 7. The flow rate may be controlled by choosing the number of additional channels 7 or their cross sectional size.

Figure 2:
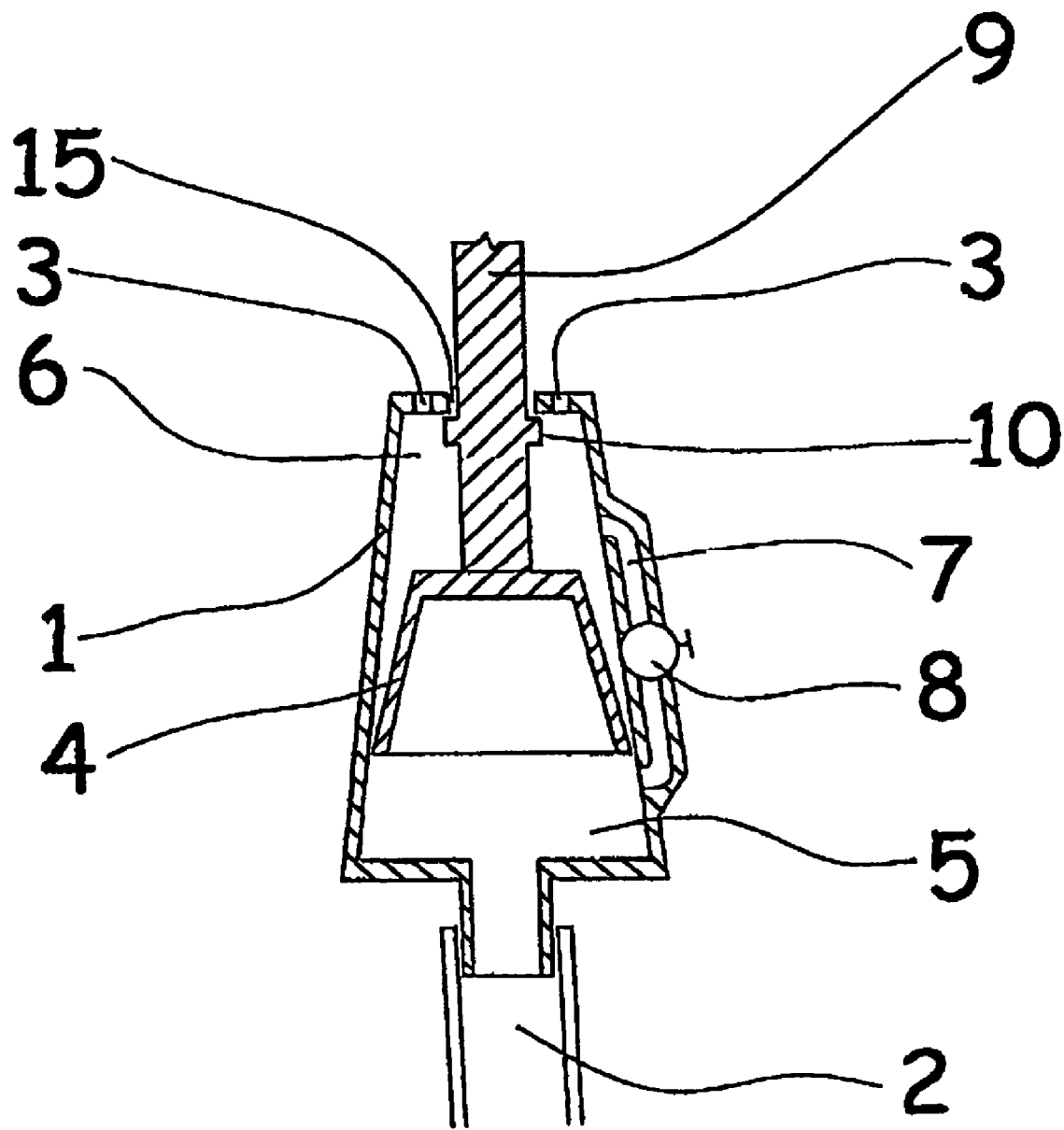
FIG. 2 shows another example of the design of an additional channel with a control valve installed in the channel.

The embodiment as shown in FIG. 2 shows another possibility of how to design the additional channel. In this embodiment, the rolling rotor 4 has the shape of a hollow truncated cone, the open end of which is oriented against the direction of the flow of the liquid. The additional channel 7 interconnects with the space 5 below the rotor 4 with the space 6 above the rotor 4 but, unlike the design shown in FIG. 1, the additional channel 7 runs outside the inner space of the chamber 1. Such a design provides for a simple installation of the control valve 8 to the additional channel 7 allowing for an easy control of the flow rate of the liquid even during the operation of the rolling fluid machine. The function of the embodiment shown in FIG. 2 is identical to that of the already described embodiment shown in FIG. 1.

Figure 3:
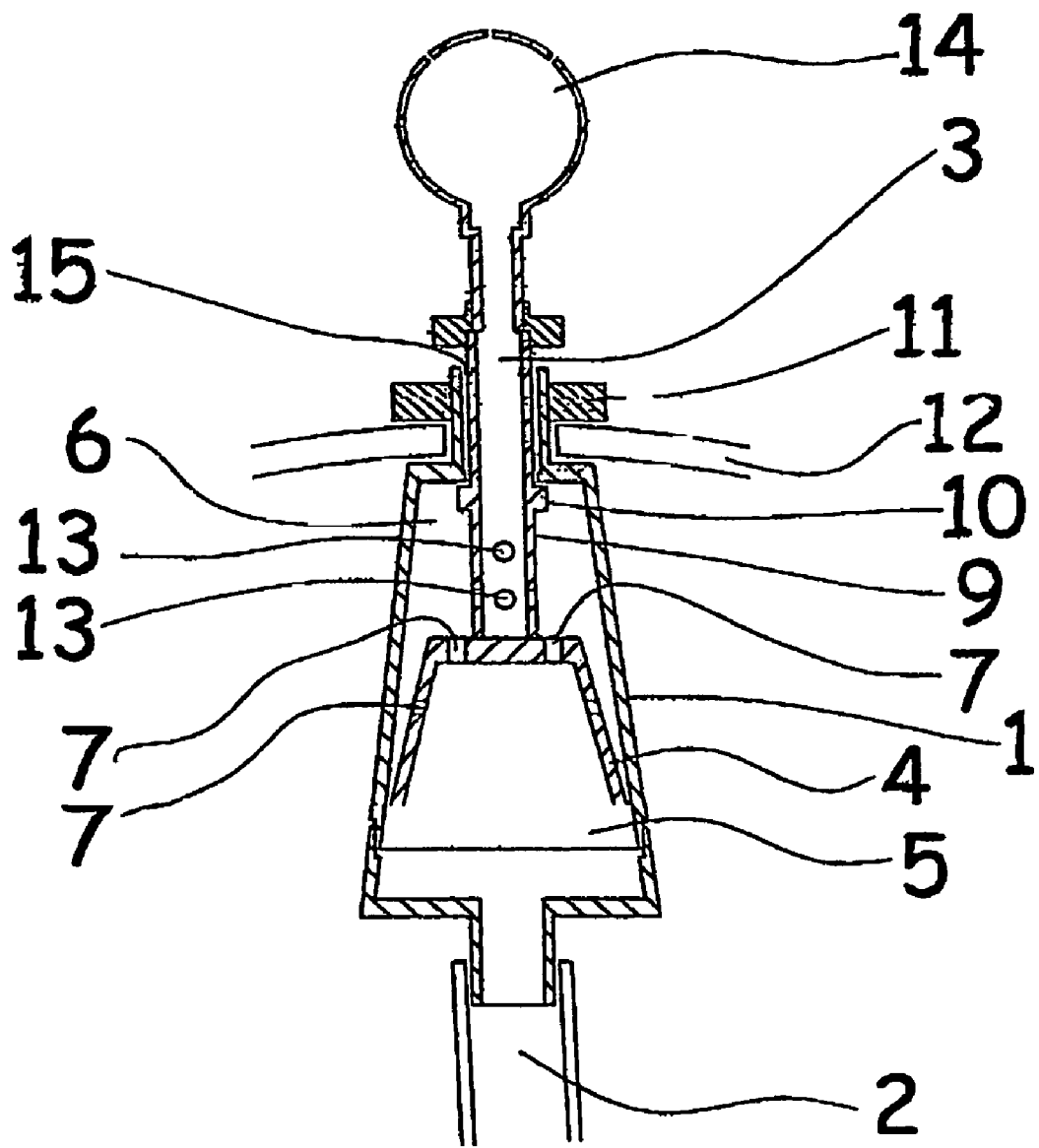
FIGS. 3 and 4 shows the channels in a fountain for instance for moisturizing air.

FIG. 3 shows an example of using the additional channels 7 in a fountain for air moisturizing or for decorative purposes. The fountain comprises a rolling fluid machine, the chamber 1 of which is fixed to the wall of a hollow vessel 12 with a nut 11. The vessel 12 is placed in a tank of liquid which is not shown in FIG. 3. The chamber 1 of the rolling fluid machine is interconnected by an inlet hose 2 with a pump, not shown.

Unlike the embodiments shown in the FIGS. 1 and 2, the embodiment shown in FIG. 3 has the outlet 3 of fluid formed by a hollow shaft 9 with entrance openings 13. At the end of the hollow shaft 9 is placed an exchangeable perforated spraying head 14.

In this embodiment the additional channels 7 comprise two openings in the upper wall of the rotor 4 and two openings in the side wall of the rolling rotor 4.

A pump, not shown in the FIG. 3, supplies the liquid through the inlet 2 to the chamber 1 of the rolling fluid machine and the rotor 4 will swing from the shown central position aside and it will touch the inner wall of the chamber 1, where it will start to roll on the inner wall of the chamber 1 in a circular motion. The protruding end of the shaft 9 with a spraying head 14 executes a precession movement with a minimum angle of oscillation.

When passing through the chamber 1, the liquid flows from the space 5 below the rotor 4 to the space 6 above the rotor through the clearance between the rolling rotor 4 and the wall of the chamber 1 and also through the additional channels 7.

A small quantity of liquid leaks from the chamber 1 through the central opening 15 through which the shaft 9 passes and the liquid flows on the surface of the vessel 12 back to the tank, not shown in FIG. 3. A substantial portion of the liquid flow leaves the space 6 above the rotor 4 via the entrances 13 and enters the hollow shaft 9 and continues through the outlet 3 to the spraying head 14 from where it is sprayed out and, thereafter, it flows on the surface of the vessel 12 back to the tank, not shown in FIG. 3.

Figure 4:
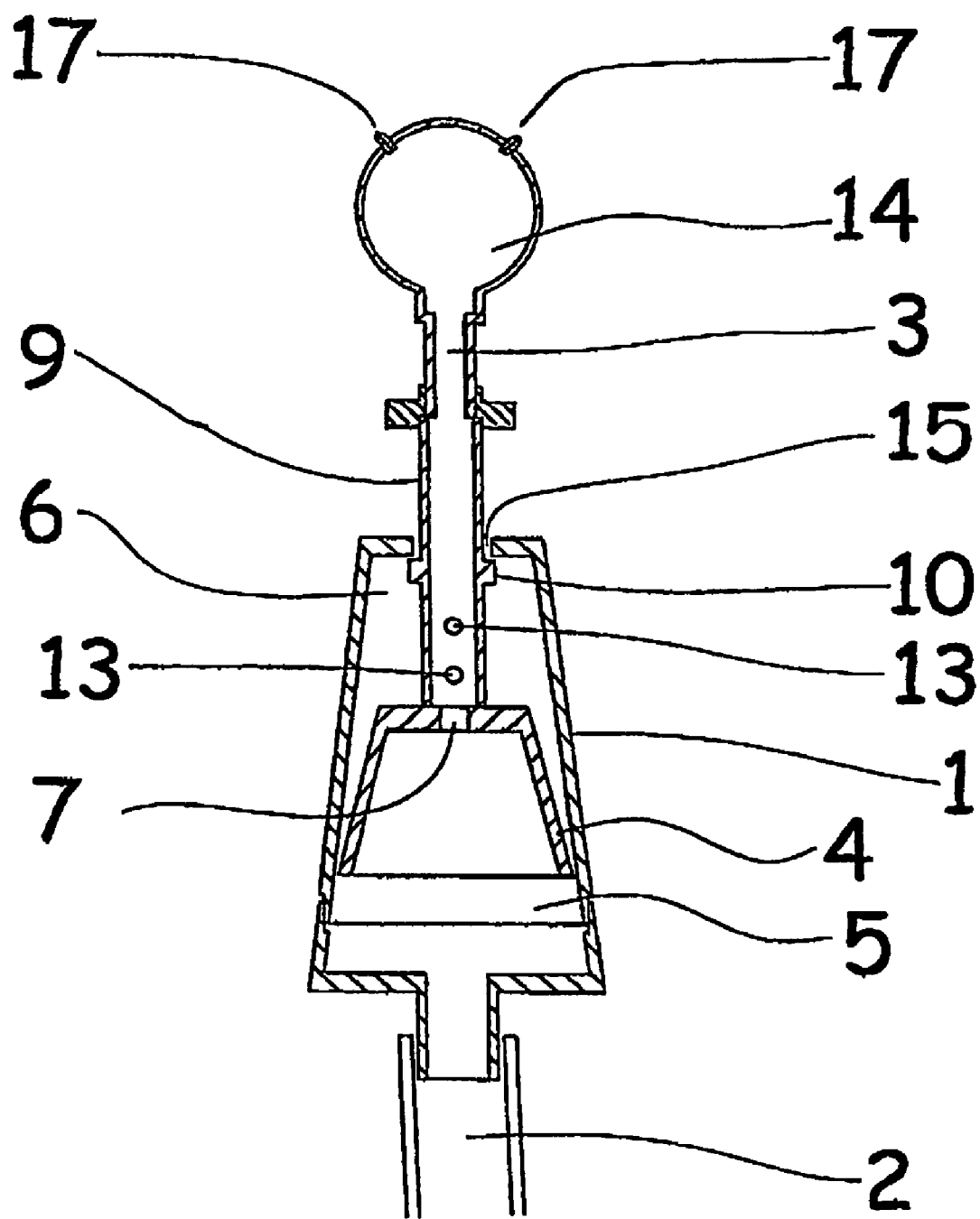

FIG. 4 shows another example of using the additional channels 7 in a fountain for air moisturizing or for decorative purposes. The embodiment shown in FIG. 4 differs from the embodiment shown in FIG. 3 only by the fact that the additional channel 7 enters directly into the hollow shaft 9. Moreover, the spraying head 14 is provided with water spray nozzles 17. The function is similar to that described above.

Figure 5:
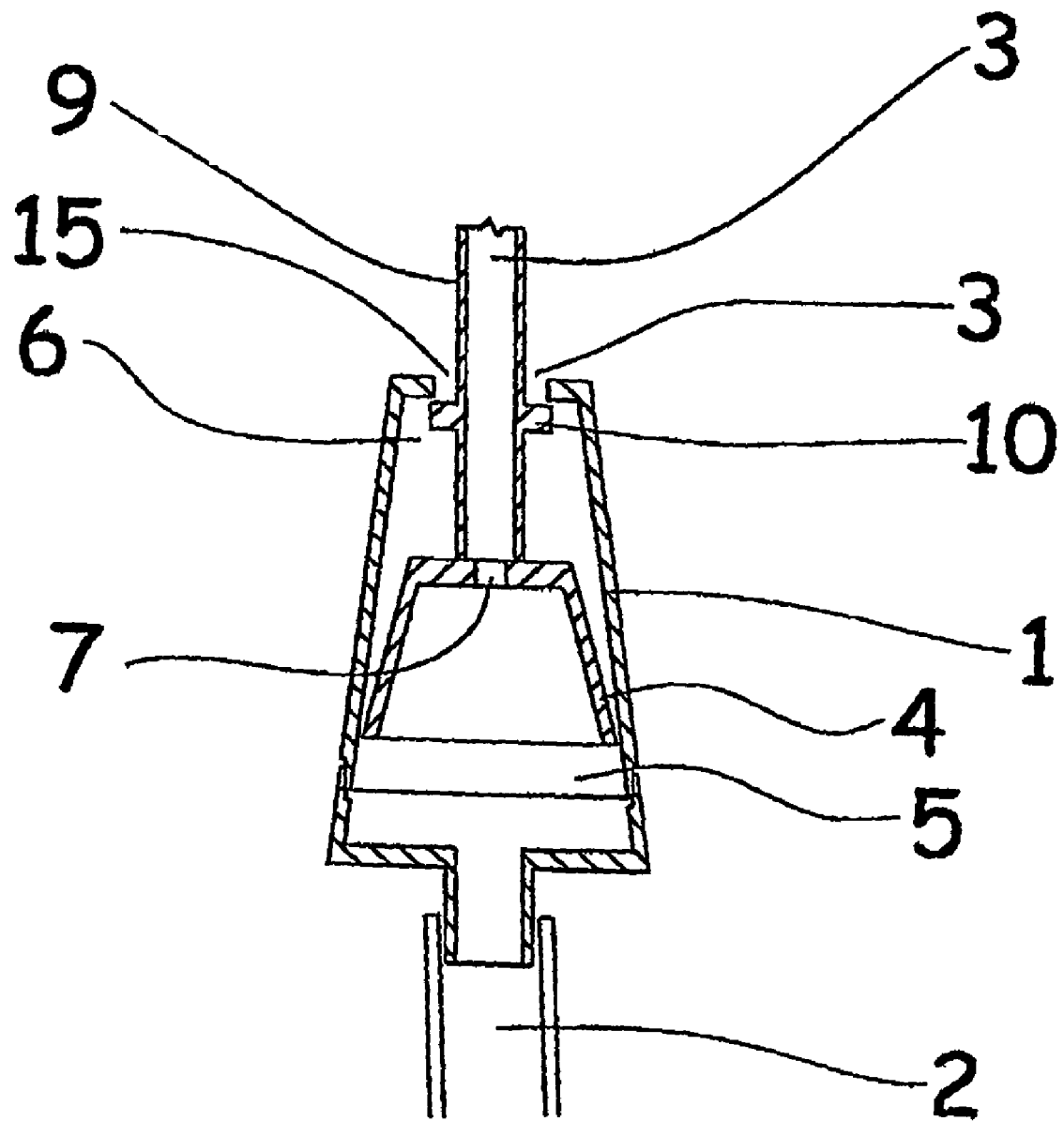
FIG. 5 shows an embodiment where the central opening in the chamber serves as a liquid outlet opening.

In the embodiments according to FIG. 5, the additional channel 7 again enters directly the hollow shaft 9. However, the hollow shaft 9 does not have any other entrance openings 13. The particularity of this design is the fact that the outlet 3 comprises of both the hollow shaft 9 and the enlarged diameter of the central opening 15 in the chamber 1. The central opening 15 is dimensioned in such a way as to allow a transfer of fluid from the space 6 above the rotor 4.

In all above described embodiments, the effective resistance faced by the flowing liquid may be exactly controlled by choosing the number and/or the cross section of the additional channels 7. In this way it is possible to choose the amount of energy of the flow to be transformed to the rotational mechanical energy. This why we can design a rolling fluid machine with a desired outlet 3 flow rate and required rotational speed or torsional moment of the rotor 4. Increasing the number and/or enlarging the cross section of the additional channels 7 will increase the flow of fluid at the outlet 3 and decrease the speed of rotation of the rotor 4.

During the testing of the two embodiments of the rolling fluid machine comparative measurements were obtained. The driving medium used was water. The size and configuration of both embodiments were identical. The only difference between the compared embodiments was the fact that the embodiment A (see FIG. 4) had an additional channel 7 while the embodiment B had no such channel.

Embodiment A (See FIG. 4)

| | |
|---|---|
| Maximum diameter of rotor 4 | 38 mm |
| Diameter of chamber 1 at the level of rolling of the rotor | 40 mm |
| Diameter of opening 13 | 4.5 mm |
| Number of openings 13 | 4 |
| Inner diameter of the hollow shaft 9 | 5.5 mm |
| Diameter of the additional channel 7 | 3 mm |

Source of pressurised liquid rotary pump Sacem, 13 W, 500 l/hour

Embodiment B (See FIG. 4 but Without an Additional Channel 7)

| | |
|---|---|
| Maximum diameter of rotor 4 | 38 mm |
| Diameter of chamber 1 at the level of rolling of the rotor | 40 mm |
| Diameter of opening 13 | 4.5 mm |
| Number of openings 13 | 4 |
| Inner diameter of the hollow shaft 9 | 5.5 mm |
| Diameter of the additional channel 7 | 0 mm |

Source of pressurised liquid rotary pump Sacem, 13 W, 500 l/hour

During the test, the spraying head 14 was removed and the rotation of the rotor 4 and the height of the water jet coming out from the hollow shaft 9 were measured under identical conditions.

Measured Values

Embodiment A: rotor revolutions: 38 rev per min, jet height 650 mm

Embodiment B: rotor revolutions: 64 rev per min, jet height 250 mm

For the experts it is clear that the only restriction of the design of the additional channels 7 is the fact that the space 5 below the rotor 4 and the space 6 above the rotor 4 have to be interconnected. Their number, shape and specific location is determined by the requirements of the amount of the flow and the use of the machine (powering of the rotary tools, air moisturizing fountains, decorative fountains etc.). Specific types of additional channels 7 may be freely combined in a single design of the rolling fluid machine.

The rolling fluid machine was described here with reference to designs powered by liquid. However, any fluid may be used as the driving medium including gas, liquid, vapours and their mixtures.

The invention claimed is:

1. A rolling fluid machine comprising:
 a chamber having an inner surface and an inner space, where at least a part of said inner surface has a rotary shape and the chamber is provided with at least one fluid inlet and at least one fluid outlet; and
 a rolling rotor comprising a wall and mounted in the chamber to provide a clearance between the rotor and the inner surface in a manner enabling rolling and swinging, wherein, a first space is provided in the chamber below the rotor and a second space is provided in the chamber above the rotor, and wherein the first space below the rotor and the second space above the rotor are directly fluidically interconnected by at least one channel, wherein the channel comprises one of an opening through the wall of the rotor and a channel arranged outside the inner space of the chamber, in addition to the clearance.

2. The rolling fluid machine as set forth in claim 1, wherein the channel comprises an opening through the wall of the rotor.

3. The rolling fluid machine as set forth in claim 2, wherein the channel is connected to a hollow shaft mounting the rotor in the chamber.

4. The rolling fluid machine as set forth in claim 1, wherein the channel is arranged outside the inner space of the chamber.

5. The rolling fluid machine as set forth in claim 4, wherein the channel includes a control valve incorporated therein.

6. The rolling fluid machine as set forth in claim 1, wherein the channel includes a control valve incorporated therein.

\* \* \* \* \*